US012641005B2

(12) United States Patent
Mukherjee et al.

(10) Patent No.: US 12,641,005 B2
(45) Date of Patent: May 26, 2026

(54) SYSTEM AND METHOD USING SWARM INTELLIGENCE IN A DECENTRALIZED NETWORK

(71) Applicant: Bank of America Corporation, Charlotte, NC (US)

(72) Inventors: Maharaj Mukherjee, Poughkeepsie, NY (US); George Albero, Charlotte, NC (US); Naga Vamsi Krishna Akkapeddi, Charlotte, NC (US); Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 49 days.

(21) Appl. No.: 18/923,957

(22) Filed: Oct. 23, 2024

(65) Prior Publication Data

US 2026/0113267 A1     Apr. 23, 2026

(51) Int. Cl.
*H04L 45/121*      (2022.01)
*H04L 45/00*       (2022.01)

(52) U.S. Cl.
CPC ............ *H04L 45/121* (2013.01); *H04L 45/14* (2013.01)

(58) Field of Classification Search
CPC .............................. H04L 45/121; H04L 45/14
See application file for complete search history.

(56) References Cited

U.S. PATENT DOCUMENTS

| | | | |
|---|---|---|---|
| 9,934,273 B1 | 4/2018 | MacCarthaigh | |
| 11,245,748 B1 * | 2/2022 | Hannon ................. | H04L 67/56 |
| 11,665,090 B1 | 5/2023 | Banerjee et al. | |
| 2007/0143375 A1 | 6/2007 | Tom et al. | |
| 2012/0089322 A1 | 4/2012 | Horvitz | |
| 2013/0024479 A1 | 1/2013 | Gong et al. | |
| 2014/0214936 A1 | 7/2014 | Abraham et al. | |
| 2016/0140253 A1 | 5/2016 | Yang et al. | |
| 2016/0342751 A1 | 11/2016 | Alstad et al. | |
| 2018/0307861 A1 | 10/2018 | Johnson | |
| 2019/0230127 A1 | 7/2019 | Gandham et al. | |
| 2019/0324958 A1 * | 10/2019 | Ow ....................... | H04L 9/3247 |
| 2020/0304413 A1 | 9/2020 | MacCarthaigh | |
| 2021/0019284 A1 * | 1/2021 | Bowman .............. | G06F 16/278 |
| 2021/0216968 A1 | 7/2021 | Mimassi | |
| 2022/0046045 A1 | 2/2022 | Rao et al. | |
| 2022/0164389 A1 | 5/2022 | Austern et al. | |

(Continued)

*Primary Examiner* — Gil H. Lee

(57)     ABSTRACT

A system includes a memory and a processor configured to determine which nodes to use for performing an action. The memory is configured to store metadata and device information associated with a plurality of nodes for performing an action. The plurality of nodes hosts at least one resource needed for performing actions, and the device information includes at least one performance parameter related to the physical configuration of each node. The processor initially receives a request to perform an action and determines from the metadata which nodes host resources needed to perform the action. The processor then retrieves device information for the identified nodes and metadata for each identified node to determine multiple combinations of nodes that may provide the resources needed to perform the action. The processor ranks the combinations using a path optimization algorithm to determine which nodes to use to perform the action.

20 Claims, 2 Drawing Sheets

(56) References Cited

U.S. PATENT DOCUMENTS

| | | | |
|---|---|---|---|
| 2022/0383157 A1* | 12/2022 | Dema .................... | G06N 20/10 |
| 2023/0054245 A1 | 2/2023 | Wright et al. | |
| 2023/0254696 A1* | 8/2023 | Ben-David .......... | H04L 9/3239 |
| | | | 455/41.1 |

* cited by examiner

SYSTEM AND METHOD USING SWARM INTELLIGENCE IN A DECENTRALIZED NETWORK

TECHNICAL FIELD

The present disclosure relates generally to network communications and, more specifically, to a system and method for using swarm intelligence in a decentralized network.

BACKGROUND

The resources needed to perform many activities may be located on multiple different devices connected by a large network, including the Internet. This complexity allows for more redundancy and improved capacity. However, new issues are encountered as these networks, and the devices that provide the resources for performing the activities, become increasingly complicated.

SUMMARY

The system and method disclosed in the present application provide a technical solution to the technical problems discussed above by providing the capability to select the best nodes for providing resources for performing an action in a decentralized computing system. The system and method provide for better performance in complex computational systems that use networks to connect more than one node. In such systems, the computational devices, such as servers, that form or host individual nodes may be geographically distributed and provide different performance levels to any particular external device requesting resources from them. Choosing the correct nodes and/or pathways to the nodes is often not a trivial matter, as the capabilities of the nodes frequently change based on load and network conditions, as well as other factors. This may result in the actions taking longer to perform or the actions failing due to resources not being provided in a timely manner.

The disclosed system and method utilize metadata and device information for each of the nodes to determine which combinations of nodes are capable of providing the resources. Then, a path optimizer algorithm, such as a swarm intelligence algorithm or ant colony optimization algorithm, chooses the best combination of nodes and network pathways to provide the resource. The system and method also periodically or continuously update the metadata and system information so that as changes occur in one or more nodes, the best combination of nodes to provide the resource is updated accordingly. In one embodiment, swarm intelligence is the collective behavior of a decentralized system of self-organized agents that work together to solve problems. The term is often used to describe the behavior of social insects, such as ants and bees, but it may also refer to artificial systems.

The system and method disclosed in the present application include a processor operably coupled to a memory configured to store metadata associated with each node of a plurality of nodes. Each of the plurality of nodes hosts at least one resource needed for performing one or more actions, and the metadata indicates which resources are hosted by each one of the plurality of nodes. The memory is also configured to device information associated with a corresponding one of the plurality of nodes. The device information includes at least one performance parameter related to a physical configuration of one or more devices associated with a corresponding one of the plurality of nodes.

The processor is configured to receive a request from an external device to perform an action. The processor determines from the request which resources are needed to perform the action. The processor then uses the stored metadata to determine which nodes of the plurality of nodes host at least one of the resources needed for performing the action. Once the nodes are determined, the processor obtains device information for each of the identified nodes, and the processor determines a value for the device information for each of the identified nodes. These hash values are then combined with the metadata for each identified node to produce a token.

The processor then determines a plurality of combinations of nodes that provide the resources using the metadata included in each token. The processor concatenates the hash values from the tokens associated with each combination to produce a digital tag for each combination. These digital tags are then ranked using a path path-optimizer algorithm based on predetermined criteria. The path optimizer algorithm utilizes a weighted graph of at least the concatenated hash values in the digital tags to determine the ranks of each combination and select the digital tag with the highest rank. Once the digital tag with the highest rank is selected, the processor performs the action using one or more of the nodes associated with the selected digital tag.

The system and method are further configured to periodically receive updated metadata from each of the plurality of nodes and determine if the updated metadata indicates a change in the resources associated with a node. The system and method update the stored metadata for the node when a change is indicated. Similarly, the system and method periodically receive updated device information from each of the plurality of nodes and determine if the updated device information indicates a change in the physical configuration of the devices associated with a node. The system and method then update the device information for the node when a change is indicated.

The disclosed system provides several practical applications, such as providing an efficient manner for choosing which nodes and network pathways to use to provide resources for performing actions. Ranking each node periodically or in real-time using a path optimizer algorithm allows for identifying problematic nodes and/or pathways and avoiding them while also being able to identify those nodes and/or pathways that have better performance. This utilizes fewer computer resources than other methods, resulting in a faster response to changing network and node conditions. Further, fewer network resources need to be used by using the best nodes and pathways, reducing latency not only for the external device requesting the action but also for other users of the nodes and network. This results in a robust network with fewer failures and bottlenecks.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, conventional solutions for determining which node and/or pathways to use for allowing an external device to use resources hosted on multiple nodes fail to find the most efficient nodes or paths. These systems frequently just use the first available node or pathways or a round-robin technique. Other systems that attempt to find these pathways and/or nodes use significant amounts of computer and/or network resources to determine a better path using real-time telemetry, AI, or other techniques. These techniques may result in the slowing of the entire system or may even result in a failure to provide the required resources. The one or more embodiments of this disclosure provide a system and method that utilizes swarm intelligence, which uses efficient self-organized agents that work together to determine the collective behavior of a decentralized system to determine the best nodes or pathways while using less computational power and causing less network latency. Embodiments of the disclosure and its advantages may be understood by referring to FIG. 1 and FIG. 2.

System Overview

Figure 1:
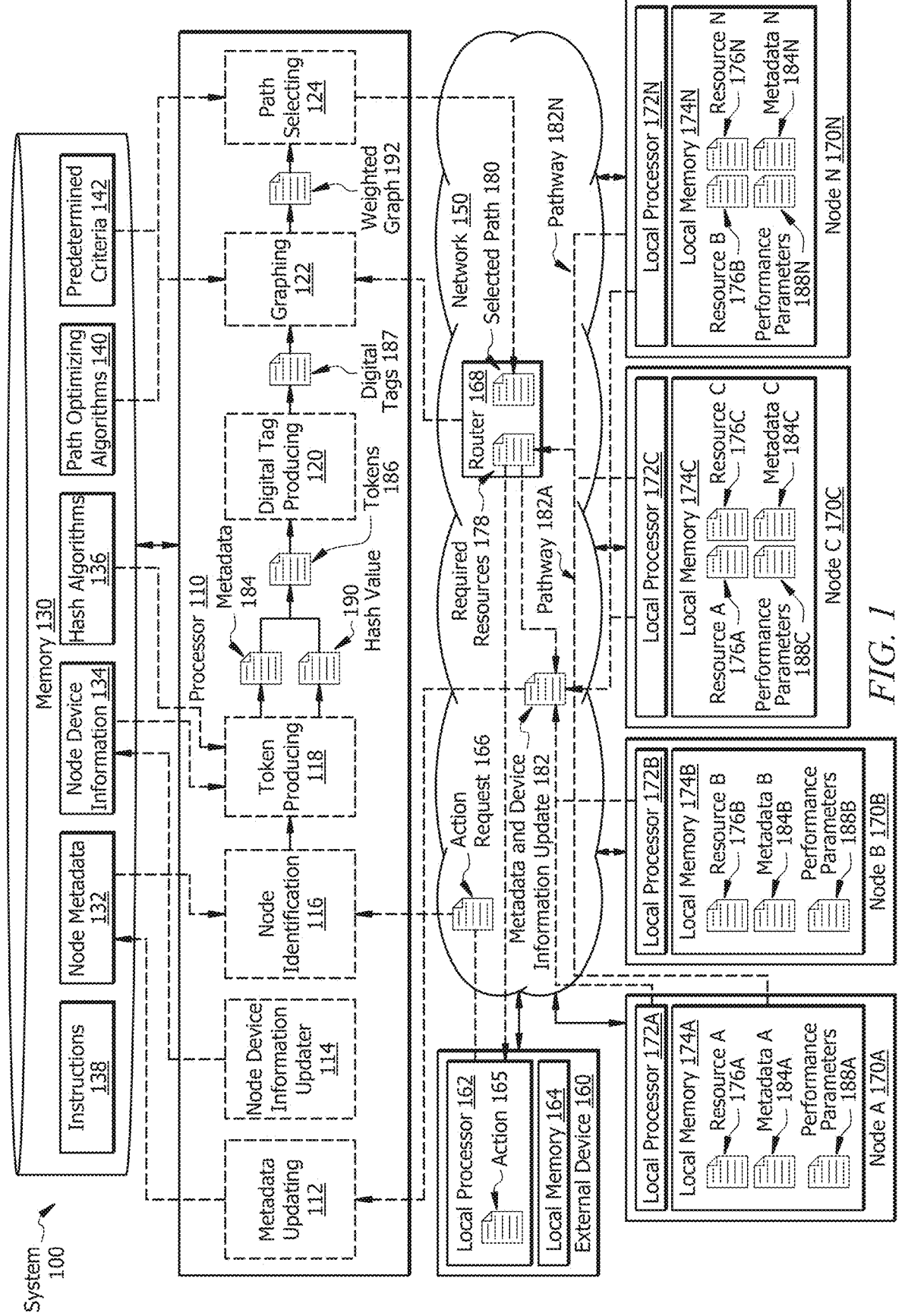
FIG. 1 illustrates one embodiment of a system configured to determine a combination of network nodes to use to provide a resource.

FIG. 1 is a schematic diagram of a system 100 configured to use a swarm intelligence optimization algorithm in a decentralized network 150 to determine which path and nodes 170A-170N to use to provide required resources 178 to an external device 160. In one or more embodiments, the system 100 includes a plurality of nodes 170A-170N that host one or more resources 176A-176N that an external device 160 may need for an action request 166. Since more than one node 170A-170N or a combination of nodes 170A-170N may be able to provide the required resources 178, a system and method are needed to determine the best network pathway 182A-182N and nodes 170A-170N. In one or more embodiments, the system includes a processor 110, which receives an action request 166 from the external device 160 and selects a pathway 180 and nodes 170A-170N to provide a required resource 178.

In one or more embodiments, system 100 comprises a processor 110 and a memory 130 in signal communication through a network 150 with an external device 160 and one or more nodes 170A-170N. The network 150 may communicate with a plurality of nodes 170A-170N distributed over various geographical locations. System 100 may be configured as shown or in any other suitable configuration, and it may include all of the components listed below or may have more or fewer components than those shown in FIG. 1.

System Components

External Devices

The external devices 160 may be any number of devices that may send an action request 166 or need one or more resources 176A-176N. Examples of an external device 160 may include but are not limited to, computers, laptops, mobile devices (e.g., smartphones or tablets), servers, clients, automated teller machines (ATM), point of sale devices (POS), or any other suitable type of devices that may send an action request 166 or need one or more resources 176A-176N. The external device 160 includes at least one local processor 162 that performs one or more actions 165, including but not limited to sending an action request 166 to processor 110 and/or using required resources 178 that are obtained from one or more nodes 170A-170N.

The external device 160 may include at least one local memory 164 for storing instructions that cause the local processor 162 to produce an action request 166 as well as perform any other actions 165 and/or applications. The local memory 164 may store other data and instructions related to the operations of the external device 160 and is not limited to the above-described instructions and data.

While FIG. 1 shows the external device 160, including a single local processor 162 and a single local memory 164, the external device 160 may include any suitable number and combination of local processors 162 and local memories 164 as well as any other necessary components. Only one local processor, e.g., 162A, and one local memory, e.g., 164, are shown in FIG. 1 for simplicity.

The external device 160 may be configured to perform any number of actions 165 or applications. These applications or actions 165 may need one or more required resources 178 that are located on other servers or nodes 170A-170N. When the external device 160 determines that data or other resources are needed for an action request 166, it sends an action request 166 to the processor 110, which causes a router 168 in the network 150 to return or provide the required resources 178 to the external device. The action request 166 may include, but is not limited to, requests from actions 165 that involve exchanging or receiving data for web pages, database data, data related to one or more applications, for entertainment, video, augmented reality, financial exchanges, and/or any other actions 165 that utilize a network 150 to facilitate the transfer of data or other resources 178 needed to perform the action request 166. For example, in a non-limiting example, an external device 160 may be running a streaming application or action 165 that needs video data hosted on one or more nodes 170A-170N. In another example, the external device 160 may perform an action 165 to allow a user to view account information stored on an institution's remote servers.

Nodes

Nodes 170A-170N may be any number of devices that provide one or more resources 176A-176N and are connected through the network 150 to the external device 160 and processor 110. The nodes 170A-170N may be external devices similar to the external device 160 or may be one or more servers that are part of one or more data centers, including cloud and edge deployments. One or more of the nodes 170A-170N may be co-located with the processor 110, or one or more of the nodes 170A-170N may be geographically dispersed and connected through a network 150 such as, but not limited to, the Internet.

Each node, e.g., 170A, includes at least one local processor 172A-172N that performs one or more processes or operations, including but not limited to sending to the processor 110 through the network 150 metadata and device information update 182 as well as proving the one or more resources 176A-176N needed by the eternal device 160 based on the action request 166. The nodes 170A-170N may also include at least one local memory 174A-174N. In one or more embodiments, the local memory 174A-174N may be stored, or alternatively, the local processor 172A-172N may host one or more resources 176A-176N and corresponding metadata 184A-184N.

The one or more resources 176A-176N may take any form. While shown as being stored on the local memories 174A-174N, the resources 176A-176N may be an application or other resource hosted by one or more local processors 172A-172N. In one or more embodiments, the resources 176A-176N may take the form of data stored in a database or stored in other forms. The resources 176A-176N may include account information, video or image data, data for producing a user interface on the external device 160, one or more applications accessed from the external device 160 through the network 150, or any other form. The resources 176A-176N may include but are not limited to, actions exchanging data for an application, such as web pages, database data, data related to one or more applications, real-time exchanges of data for entertainment, video, augmented reality, financial exchanges, and/or any other action that utilizes a network 150 to facilitate that transfer of data that is part of the required resources 178. The resources 176A-176N may take any form that action request 166 needs.

In one or more embodiments, more than one node 170A-170N may host a particular resource, e.g., resource A, 17A, which, as shown in FIG. 1, is hosted in Node A 170A and Node C 170C. A single node, e.g., 170C, may host more than one resource, resource A 176A and resource C 176C. Different combinations of resources 176A-176N may be hosted by different nodes 170A-170N. Each of the nodes 170A-170N may provide a metadata and device information update 182 to the processor 110 through the network 150. In one or more embodiments, the node metadata 132 is related to the resources 176A-176N stored on the nodes 170A-170N, while the device information provides information on the hardware forming the nodes 170A-170N.

Each resource, e.g., 176A, may have metadata, e.g., 184A associated with it. The metadata 184A-184N includes information such as, but not limited to, what data is included in the resource, when the resource was last updated, ownership of the resource or data, and any other information that the processor 110 may need to determine if the resource, e.g., 176A is up to date and/or able to provide required resource 178 to the external device 160 as a result of an action request 166. Similarly, each node, e.g., 170A, tracks and maintains device information related to the operational status of the local processor, e.g., 172A, local memory, e.g., 174A, and any other devices or hardware, including network routers (not shown), or other network equipment needed for the node 170A to communicate with the network 150 and provide required resources 178 through router 168 to the external device 160.

While FIG. 1 shows the nodes 170A-170N each including a single local processor 172A-172N and a single local memory 174A-174N, they may include any suitable number and combination of local processors 172A-172N and local memories 174A-174N as well as any other necessary components; with only one local processor, e.g., 174A and one local memory, e.g., 174A being shown in FIG. 1 for simplicity. Similarly, FIG. 1 shows the nodes sending a single metadata and device information update 182 through the network 150 to the processor 110; however, each node, e.g., 170A, may send its own metadata 184A and device information in the metadata and device information update 182. Further, the metadata and device information update 182 may be sent periodically, for example, every second, every thirty seconds, every thirty minutes, every hour, or any other period, or the metadata and device information update 182 may be sent continuously or one when changes occur in the resources 176A-176N or devices making up an individual node, e.g., 170A.

Network

The network 150 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 150 may be configured to support any suitable type of communication protocol as would be appreciated by one of ordinary skill in the art.

In one or more embodiments, the network 150 may connect the nodes 170A-170N with the external device 160 and processor 110 using one or more pathways 182A-182N. One or more of the nodes 170A-170N may form part of the network 150 and take the form of switches or routers for routing resources, e.g., 176A, to other nodes, e.g., 170B and/or the external device 160 and processor 110, using one or more pathways 182A-182N.

Further, the network 150 may include an optional router 168 that receives from the processor 110 selected nodes and pathways 180 and routes the required resources 178 through the network 150 to the requesting external device 160 from one or more nodes, e.g., 170A using one or more pathways, e.g., 182A. In one or more embodiments, the optional router 168 may perform security checks and analysis of the network 150 to ensure that the required resources 178 are efficiently and correctly routed from one or more nodes 170A-170N to the external device 160.

The specific configuration of the network 150, the number of pathways 182A-182N, and the number of nodes 170A-170N connected to it is exemplary, and the disclosure is not limited to the number or configuration shown in FIG. 1. Although the network 150 is shown as having a single router 168, in one or more embodiments the network 150 contains a plurality of routers, switches and other network devices connecting the nodes 170A-170N to the external device 160 and/or the processor 110. Further, while shown separately, the processor 110 may optionally be part of the network 150 or the router 168.

Memory

Memory 130 may be any type of storage for storing a computer program comprising instructions 138, node metadata 132, node device information 134, hash algorithms 136, path optimizing algorithms 140, and predetermined criteria 142. The memory 130 may be a non-transitory computer-readable medium in operative communication with the processor 110. The memory 130 may be one or more disks, tape drives, or solid-state drives. Alternatively, or in addition, the memory 130 may be one or more cloud storage devices. The memory 130 may also be used as an over-flow data storage device to store applications when such applications are selected for execution and to store instructions 138 and data that are read during the execution of the applications. The memory 130 may be volatile or non-volatile. It may comprise read-only memory (ROM), random-access memory (RAM), ternary content-addressable memory (TCAM), dynamic random-access memory (DRAM), and static random-access memory (SRAM).

The memory 130 stores instructions 138 that, when executed by the processor 110, causes the processor 110 to perform the operations described in FIGS. 1 and 2 below. Instructions 138 may comprise any suitable set of instructions, logic, rules, or code. The memory 130 may include storage that takes the form of a database for storing such things as node metadata 132, node device information 134, hash algorithms 136, and path optimizing algorithms 140. These may be stored and recalled using known protocols such as SQL, XML, and/or any other protocol or language that a user, administrator, or developer of the system 100 wishes to use. The node information metadata 132, node device information 134, hash algorithms 136, path optimiz-
ing algorithms 140, and predetermined criteria 142 may be
stored in other forms, and the disclosure is not limited to any
of these in a database.

The memory 130 in one or more embodiments stores node
metadata 132. Node metadata 132 includes metadata **184A-
184N, which corresponds to one or more resources 176A-
176N located on the nodes 170A-170N. Each node 170A-
170N may store different resources, e.g., 176A**, and
therefore, the metadata 184A-184N stored in node metadata
132 may be different for each node 170A-170N. The meta-
data 184A-184N stored in node metadata 132 may include
such information as when the data or resource was last
updated, which applications are supported by a node, e.g.,
170A, and any other information that the processor 110
needs for determining which node 170A-170N and/or path
to use for providing required resources 178 to the external
device 160.

The memory 130 in one or more embodiments stores node
device information 134. The node device information 134
may include telemetry for the various hardware components
making up a specific node, e.g., 170A. This may include
such information as how many external devices, e.g., 160,
are currently receiving one or more resources from a node,
e.g., 170A. It may include any information on performance
parameters 188A-188N including, but not limited to, the
physical configuration, connection speed, current usage
level, and any other performance parameters 188A-188N
and/or physical characteristics and configurations of one or
more devices associated with a node, e.g., 170A. It also may
include information such as the geographical location of the
server(s) hosting the node, e.g., 170A, network information.
The node device information 134 may also include data on
security and other characteristics of the node, e.g., 170A,
and any other information that the processor 110 may need
to determine the best path and node to use.

The memory in one or more embodiments stores hash
algorithms 136. These may be any hash algorithms that are
useful for the processor 110 to produce tokens 186. The hash
algorithms 136 are designed to make the node device
information 134 more compact and/or easier to compare
with those from other nodes, e.g., 170B. The hash algo-
rithms 136 may be any hash algorithm 136, including those
used for checksums and cryptographic hash functions such
as SHA-256 and any other hash algorithms 136 that are
useful for producing the tokens 186.

The memory 130 in one or more embodiments stores path
optimizing algorithms 140 and predetermined criteria 142.
The path optimizing algorithms 140 are any algorithms that
allow for the processor 110 to perform graphing 122 and
path selecting 124 using predetermined criteria 142 to select
the one or more nodes 170A-170N that are best for provid-
ing required resources 178. In one or more embodiments, the
path optimizing algorithms 140 may take the form of a
swarm intelligence optimization algorithm, which uses effi-
cient self-organized agents that work together to determine
the collective behavior of a decentralized system to deter-
mine the best nodes, e.g., 170A and/or pathways **182A-
182N. The best pathways 182A-182N and nodes 170A-
170N** may be selected based on multiple predetermined
criteria 142, including both the node metadata 132 and the
node device information 134, as will be described in more
detail below.

One example of swarm intelligence is an ant colony
optimization algorithm. However, the path optimizing algo-
rithms 140 are not limited to ant colony optimization or
swarm intelligence. In general, any path optimizing algorithm 140 may be used in one or more embodiments. An ant
colony optimization algorithm is a probabilistic technique
for solving computation problems and finding good paths
through graphs. The behavior of real ants inspires the
algorithms. Each path to a resource is ranked by an agent
that tests the path. Over multiple iterations, the best path to
a resource is determined. For example, if there are a hundred
nodes, e.g., 170A, and only fifty of the nodes, e.g., 170A,
host the required resources 178, then on the first iteration,
the fifty that do not host the required resources 178 would
have a lower rank or no rank compared to the fifty that host
the required resources 178. In the next iteration, it may be
determined that twenty-five of the remaining nodes that host
the required resources 178 have less network latency than
the other twenty-five, so these would be ranked higher yet.
This is repeated until only a few or preferably one node, e.g.,
170A, and/or pathways 182A-N to the node, e.g., 170A, is
ranked highest and then selected by the processor 110 to
provide the required resources 178.

Processor

Processor 110 receives action requests 166 from the
external device 160 and, in one or more embodiments,
causes router 168 to provide the required resources 178 back
to the external device 160, using the network 150. The
processor 110 uses the node metadata 132 and node device
information 134 to determine the best node, e.g., 170A, or
nodes 170A-170N to provide the required resources 178 as
well as the best path to provide the required resources 178
through, where more than one pathway, e.g., 182A, exists
between the node, e.g., 170A and the external device 160.
The processor 110 may take the form of any electronic
circuitry including, but not limited to, state machines, one or
more central processing unit (CPU) chips, logic units, cores
(e.g., a multi-core processor), field-programmable gate array
(FPGAs), application specific integrated circuits (ASICs), or
digital signal processors (DSPs). The processor 110 may be
a programmable logic device, a microcontroller, a micro-
processor, or any suitable combination of the preceding. The
processor 110 is communicatively coupled to and in signal
communication with the memory 130. The one or more
processors making up the processor 110, which are config-
ured to process data, may be implemented in hardware or
software. For example, the processor 110 may be 8-bit,
16-bit, 32-bit, 64-bit, or of any other suitable architecture.
The processor 110 may include an arithmetic logic unit
(ALU) for performing arithmetic and logic operations, pro-
cessor registers that supply operands to the ALU and store
the results of ALU operations, and a control unit that fetches
instructions 138 from memory 130 and executes them by
directing the coordinated operations of the ALU, registers
and other components.

The processor 110 is in operative communication with the
memory 130. The processor 110 is configured to implement
various instructions 138 stored in memory 130. The proces-
sor 110 may be a special-purpose computer designed to
implement the instructions 138 and/or functions disclosed
herein. For example, the processor 110 may be configured to
perform operations, including the operations of the methods
described in FIG. 2.

The processor 110 uses the node metadata 132, node
device information 134, hash algorithms 136, path optimiz-
ing algorithms 140, and predetermined criteria 142 stored in
the memory 130 to perform various operations such as, but
not limited to, metadata updating 112, node device infor-
mation updating 114, node identification 116, token produc-
ing 118, digital tag producing 120, graphing 122, and path
selecting 124 operations. The processor 110 may perform more or fewer operations than shown in FIG. 1 and described in FIG. 2; the specific operations shown are only examples. While a single processor 110 is shown, the processor 110 may include a plurality of processors or computational devices. The operations, e.g., metadata updating 112, node device information updating 114, node identification 116, token producing 118, digital tag producing 120, graphing 122, and path selecting 124 operations described herein as being performed by the processor 110 may be performed by a separate processor or software application executed on a single computational device, e.g., processor 110, or they may be located on separate servers and/or even separate datacenters such as a cloud server, the external device 160, and/or one or more nodes 170A-170N.

In one or more embodiments, processor 110 receives via the network 150 a metadata and device information update 182. As described above, this metadata and device information update 182 includes updates to the metadata 184A-184N stored in node metadata 132, reflecting changes in the resources associated with one or more nodes 170A-170N. For example, if resource A 176A is a database, then when a new data entry is made, or data is deleted from the database forming resource A 176A stored on Node A 170A, then the metadata and device information update 182 for node A 170A would indicate that change. Similarly, if Node A 170A is hosted on an offline server, the metadata and device information update 182 would update the node device information 134 to indicate that Node A 170A is offline. When no change has occurred in a particular node, e.g., 170A, then there may not be a metadata and device information update 182 for at least that particular node, e.g., 170A. Each node 170A-170N may send metadata and device information updates 182, at least when changes occur to the resources 176A-176N and hardware associated with the nodes 170A-170N. Alternatively, metadata and device information updates 182 are sent periodically, such as every minute, hour, and day, to ensure that the node metadata 132 and node device information 134 are up to date.

Returning to the processor 110, the processor receives the metadata and device information update 182 and performs metadata updating 112 and node device information updating 114. When the processor 110 performs metadata updating 112, any changes in the metadata and/or resources 176A-176N are used to update the node metadata 132 stored in the memory 130. Similarly, the processor 110, when performing node device information updating 114, determines any device changes of the nodes 170A-170N to update the node device information 134.

At a later time or while performing metadata updating 112 and node device information updating 114, the processor 110, in one or more embodiments, receives an action request 166 from the external device 160. This action request 166 is for a resource, e.g., 176A, that is hosted on one or more of the nodes 170A-170N and needed by the local processor 162 to perform an action 165 or application. For example, in a non-limiting example, the external device 160 may be performing/hosting a web browser that needs a web page, which may also need data to display in the user interface of the web page. This may be a single resource, e.g., 176A, or multiple resources, e.g., 176A and 176B. The action request 166 may identify the specific resources, e.g., 176A, that are needed by the external device 160 to perform the action 165, or the processor 110, performing node identification 116, may determine the required resources 178 based on other information included in the action request 166.

For example, in a non-limiting example, the processor 110, when receiving an action request 166 for an account balance, may determine that this requires two resources, e.g., 17A and 176B, such as an account balance and the corresponding graphical user interface (GUI) for presenting the account balance. In another non-limiting example, the action request 166 may be to stream a movie, the processor 110 may determine that along with resource A 176A that corresponds to the movie, the action request 166 also requires resource B 176B and resource C 176C, which are commercials.

When the processor 110 receives the action request 166, the processor 110 performs node identification 116. From the action request 166, the processor 110 determines which resources 176A-176N are needed for the action request 166. The processor 110 then uses the metadata 132 to identify which nodes 170A-170N host the resource. The processor 110 then retrieves node device information 134 from the memory for at least the nodes 170A-170N, which the node metadata 132 indicates has one or more required resources 178.

The processor 110, when performing token producing 118, utilizes a hash algorithm 136 to produce a hash value 190 of the node device information 134 for at least the nodes 170A-170N that were identified by the processor performing node identification 116 that have one or more required resources 178. The processor takes node device information 134 and identifies one or more performance parameters 188A-188N that are or will help determine which nodes 170A-170N and pathways 182A-182N are most useful or optimized for providing required resources 178 to the external device 160. In one or more embodiments, the one or more performance parameters 188A-188N are such things as resource availability, latency, energy use, present and future availability, security parameters, and any other parameters that have been identified by a user, administrator, developer, or other party as being helpful in determining which nodes 170A-170N and paths 182A-182N are the best for providing the required resources 178.

When producing the token 186, the processor 110 takes values related to or part of the one or more performance parameters 188A-188N from the node device information and applies a hash algorithm 136 from the memory to produce a hash value 190. This hash value 190 is combined by the processor 110 with the node metadata 184 for each of the nodes, e.g., 170A that are indicated to host the required resources 178, the combined hash values 190 and node metadata 184 forms one or more tokens 186. These tokens 186 are then analyzed by the processor 110 performing digital tag producing 120 to determine which tokens 186 and/or combination of tokens 186 provide all of the required resources 178. Each combination of tokens 186 has the hash values 190 concatenated or combined in another way to produce digital tags 187.

For example, in a non-limiting example, if processor 110 receives an action request 166 that identifies that resource A 176A and resource B 176B are needed for the action request 166, the processor 110 in the node identification 116, would identify Node A 170A, Node B 170B, Node C 170C and Node N 170N as all hosting required resources 178. The processor 110 then performs token producing 118 for each of these nodes 170A-170N and produces tokens 186 from the metadata 184 and hash values 190. Then, the processor 110 would produce multiple digital tags 187 when performing digital tag producing 120. Specifically, tokens for Node A 170A and Node B 170B would be combined or concatenated to produce a first token, e.g., 186, Node A 170A and Node N 170N would be combined or concatenated to produce a second token, e.g., 186, and Node B 170B would be combined or concatenated with Node C 170C to produce a third token, e.g., 186. Information about the pathways 182A-182N that connect at least the router 168 to the nodes 170A-170N would also be retrieved.

The processor 110 then performs graphing 122 and analyzes the digital tags 187 along with information related to the network pathways 182A-182N. In one or more embodiments, the digital tags 187 and/or the tokens 186 are clustered based on the predetermined criteria 142 so that the digital tags 187 and/or tokens 186 corresponding to the combination of nodes 170A-170N that have the same or similar metadata 184A-184N are clustered together, and those that have different metadata 184A-184N are clustered farther apart producing in one or more embodiments to produce a weighted graph 192 which may be a swarm intelligence (SI) graph. This weighted graph 192 may then be explored by the processor 110 performing path selecting 124.

When performing path selecting 124, the processor 110 uses a path optimizing algorithm 140 stored in memory 130, such as, but not limited to, swarm intelligence optimization algorithm, including ant colony-based optimization algorithm. When using ant colony-based optimization, the processor 110 uses the weighted graph 192 to rank each possible combination/digital tag 187. The processor 110 uses the hashed tokens along with any information on the pathways 182A-182N for connecting the nodes 170A-170N to the router 168. It produces a weighted graph 192 of at least the concatenated hash values 190. Over several iterations, the processor 110 determines the best pathway 182A-182N and nodes 170A-170N for providing required resources 178 to the external device 160. The result of the processor 110 performing digital tag producing 120 is a plurality of digital tags 187 that have been ranked based on the results of the path optimizing algorithms 140. The ranking may take into account such factors as the performance of the pathways, e.g., 182A-182N connecting the node, e.g., 170A to the router 168, the device information 134 for the Node, e.g., 170A including, for example, device performance, capacity, speed, current load, and energy efficiency. For example, if the digital tag 187 related to the combination of Node A 170A and Node B 170B is found to have the required resources 178 and better performance compared to the digital tag 187 for the combination of Node C 170C and Node N 170N, then the first digital tag, would be ranked higher.

Once the digital tags 187 are ranked and graphed by the processor 110 performing graphing 122, the processor performs path selecting 124. The processor 110 selects the digital tag 187 with the highest rank, determines which nodes 170A-170N correspond to the selected digital tags 187 as well as the pathways 182A-182N that best communicate the required resources 178 from the selected nodes 170A-170N to the router 168, and sends the selected nodes and paths 180 to the router 168. Alternatively, or in addition, the processor 110, when performing path selecting 124, notifies individual nodes, e.g., 170A, to begin providing the resource to the external device 160 through network 150 without the use of router 168.

Identifying a Network Pathway Process

Figure 2:
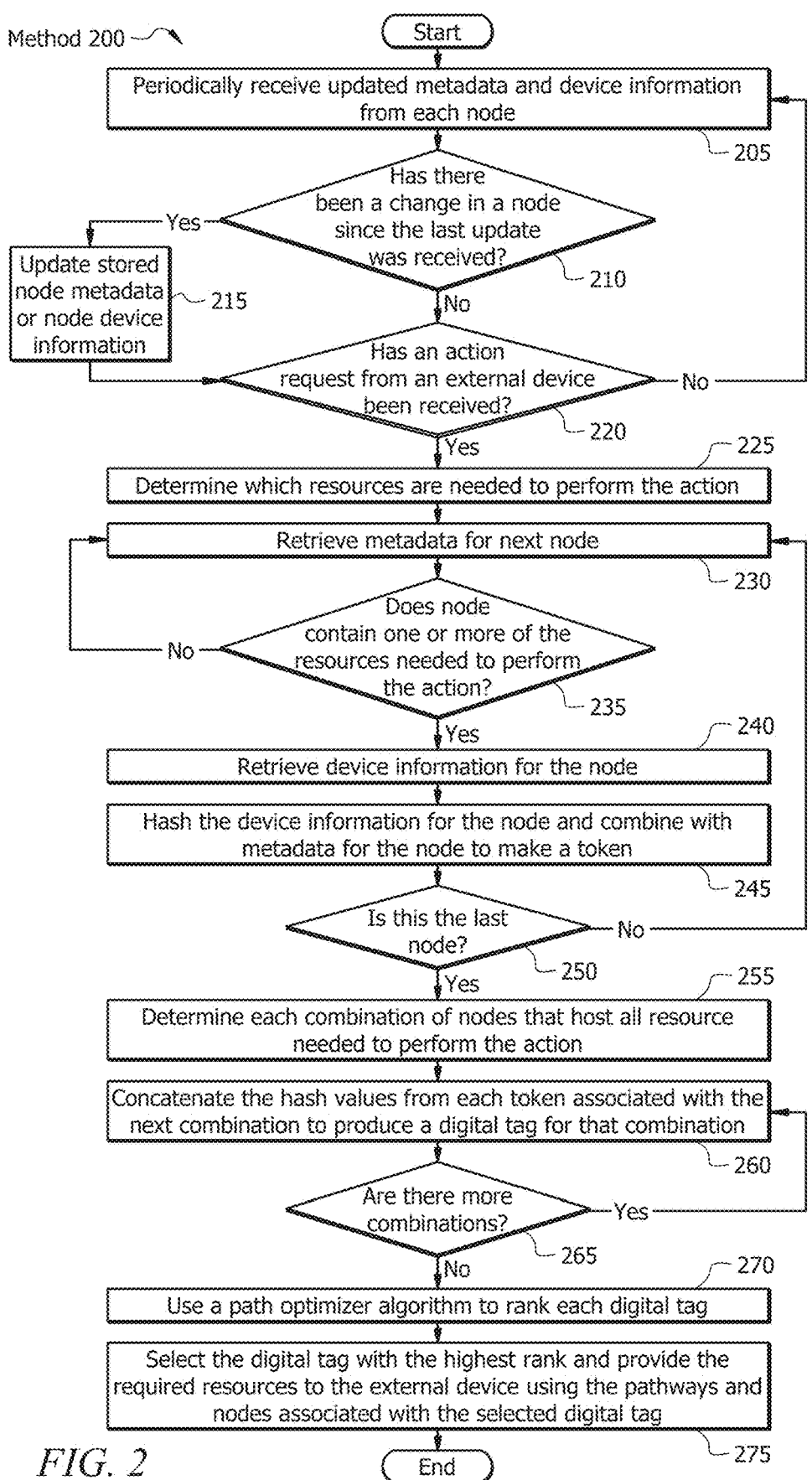
FIG. 2 illustrates one embodiment of a flowchart for using swarm intelligence in a decentralized network to determine which nodes to use to provide a resource.

FIG. 2 is a flowchart of an embodiment of method 200 for identifying by the processor 110 a network pathway, e.g., 182A, and one or more nodes 170A-170N to be used for providing required resources 178 to the external device 160. The processor 110 may execute instructions 138 stored in the memory 130, which employ method 200 for identifying a network pathway, e.g., 182A, and one or more nodes

170A-170N for providing required resources 178 in response to an action request 166 from the external device 160.

The method 200 begins at operation 205, where the processor 110 periodically receives metadata and device information updates 182 from each node 170A-170N. The updated metadata and device information updates 182 may be received and/or sent when any changes occur in a particular node, e.g., 170A occurs or on a periodic schedule such as, but not limited to, every second, every minute, every hour, every day, and/or any other time period. Alternatively, the nodes 170A-170N may send metadata and device information updates 182 continuously or based on signals from the processor 110. In one or more embodiments, the processor 110 may also receive information on the performance of one or more network paths 182A-182N from the network and/or the router 168.

When the processor 110 receives the metadata and device information updated 182 in operation 205, it determines in operation 210 if there has been a change in a node, e.g., 170A since the last update was received. If a change has occurred, then the processor 110 in operation 215 updates the node metadata 132 and/or node device information 134 as appropriate for that node, e.g., 170A. For example, in a non-limiting example, a change may be determined in a node, e.g., 170A, if the physical configuration or performance parameters 188A-188N of one or more devices associated with the node, e.g., 170A changes, such as but not limited to the devices associated with the node, e.g., 170A being moved to a different geographical position or additional devices being added at an existing location. In another example, a change may occur in the data associated with a resource, e.g., 176A, hosted by a node, e.g., 170A. When a change occurs in a resource, e.g., 176A, a corresponding change occurs in the metadata, e.g., 184A, associated with that resource, e.g., 176A, on a particular node, e.g., 170A.

In operation 220 the processor 110 determines if an action request 166 has been received from an external device 160. If no action request 166 has been received operations 205-220 may be performed continuously or periodically by the processor 110. However, at some later time or while the periodic updating is performed by the processor 110 in operations 205-220, the processor 110 may receive from an external device 160 an action request 166. As described above, the action request 166 may be a request related to an action 165 that requires access to or use of one or more resources 176A-176N located on one or more nodes 170A-170N. The action request 166 may be in the form of a specific request for specific resources, for example, a specific request for a value from a database, or it may be more general, such as a request to use an application that is hosted by one or more of the nodes 170A-170N along with data that is hosted on one or more other nodes 170A-170N. The action request 166 may take any form and is not limited to those described herein.

Once the request from the external device 160 is received in operation 220, the processor then determines which resources 176A-176N are needed to perform the action 165 in operation 225. For some action requests 166, this may only be a single resource, e.g., 176A; for others, it may be a plurality of resources 176A-176N. For example, if the action request 166 is for a specific piece of data, it may be a single resource, e.g., 176A, that is stored in a database. If, however, the action request 166 is for a website, multiple resources 176A-176N may be needed, such as for example, resources hosted by a web server and user data stored in a separate database.

Once the processor 110 identifies which resources are needed to perform the action 165 in operation 225, the processor 110 begins to retrieve node metadata 132 from the memory 130 for each node in operation 230. In one or more embodiments, the processor 110 in operation 235 determines if a specific node, e.g., 170A as indicated by the node metadata 132 for that node, e.g., 170A, includes one or more of the resources 176A-176N that are part of the required resources 178. If the node metadata 132 indicates that the node, e.g., 170A, does not include one or more of the required resources 178, the processor returns to operation 230 and retrieves node metadata for the next node, e.g., 170A. If, however, in operation 235, it is determined that the node, e.g., 170A, hosts a required resource 178, the node device information 134 is retrieved for the node, e.g., 170A, in operation 240. This node device information 134 may, in one or more embodiments, include information on the network pathways 182A-182N that connect the router 168 or the external device 160 to the node, e.g., 170A. The information may include one or more performance parameters 188A-188N such as, but not limited to, data readiness, quality, proximity, speed to time taken to provide a resource 176A-176N, and the current usage level for the node, e.g., 170A The processor 110 hashes the node device information 134 for the node, e.g., 170A, and combines that hash value 190 with the metadata 184 in operation 245 to produce a token 186.

In operation 245, the processor 110 takes the node device information 134 and assigns predetermined aspects or performance parameters 188A-188N to pre-defined variables. These pre-defined variables may be chosen by a system administrator or developer alternately, or in addition, the pre-defined variable may be selected based on the specific action request 166 that the processor 110 receives. These variables may be such things as the operational status of the node, e.g., 170A, the congestion on the network pathway(s) 182A-182N between the node, e.g., 170A and the router 168 or the external device 160, the latency of the network pathway(s) 182A-182N, the speed of the node, e.g., 170A or any other pre-defined variables. Once the pre-defined variables are extracted from the node device information 134, those variables are then auto hashed using a hash algorithm 136 to create a hash value 190 that is combined with the metadata, e.g., 184A for that node, e.g., 170A to produce a token 186.

In operation 250, the processor 110 determines if the current node, e.g., 170A, is the last node, e.g., 170N; if not, operations 230-250 are repeated until all nodes 170A-170N have their metadata, e.g., 184A analyzed for the required resources 178. This results in a token 186 being produced for each of the nodes 170A-170N that host at least one of the required resources 178. Once all the nodes 170A-170N are analyzed in operations 230-250, the processor 110 in operation 255 then uses the tokens 186 and their corresponding node metadata 132 to determine each combination of nodes 170A-170N that host all the required resources needed to perform the action request 166. This may be a single node, e.g., 170A, that hosts all the required resources 178, or it may be a combination of multiple nodes 170A-170N that together host all the required resources 178. Each node, e.g., 170A, may be part of more than one combination, and a single node, e.g., 170C, may provide more than one resource, e.g., resource A 176A and resource C 176C.

Once the processor 110 determines the combination in operation 255, the hash values 190 from the tokens 186 associated with each combination are concatenated or combined to produce a digital tag 187 for that combination in operation 260. These digital tags 187 may indicate the performance of a particular combination of nodes 170A-170N. In operation 265, the processor 110 determines if all of the combinations have had digital tags 187 produced; if not, operations 260-265 are repeated until all combinations have had digital tags 187 produced.

Once all of the combinations have had digital tags 187 produced, the processor 110 uses a path optimizer algorithm 140 to rank each combination using the data obtained from the digital tags 187. In one or more embodiments, the processor 110 uses ant colony-based optimization; however, any form of swarm intelligence or path optimizing may be used, and the disclosure is not limited to ant colony-based optimization or swarm intelligence.

In swarm intelligence and/or ant colony-based optimization, each path to the required resources 178 is ranked by the processor 110 or an agent thereof that tests the path. Each pathway 182A-182N and nodes 170A-170N is given a weight and a weight graph 192 is produced of the concatenated hash values 190 in the digital tags 187. The weight is determined based on the node metadata 132 or other aspects of the nodes 170A-170N and pathways 182A-182N, which may provide the required resources 178 and have the best performance.

The processor 110 simulates different combinations and pathways 182A-182N using the weighted graphs 192 and, over multiple iterations, determines the best path to a particular resource, e.g., 176A, based on predetermined criteria 142. The predetermined criteria 142 may include such things as time taken or latency for providing the required resources 178, quality, proximity, or data readiness of the nodes 170A-170N based on the node device information 134 stored in the tokens 186. The best paths may also be determined by analyzing performance information for network connections or pathways 182A-182N, such as latency and other characteristics of the network pathways 182A-182N. The predetermined criteria may take any other form without departing from the disclosure.

For example, in a simplified example, if there are a hundred nodes, e.g., 170A, and based on information included in the digital tags 187 or elsewhere, it is determined that fifty of the nodes, e.g., 170A, host all of the required resources 178 on a single node, e.g., 170A, then on the first iteration the fifty that host the required resource 178 on a single node may be ranked higher than the other fifty. In the next iteration, it may be determined that twenty-five of the remaining nodes that host the required resources 178 have less latency than the other twenty-five, so these would be ranked higher yet. This is repeated until only a few or preferably one node, e.g., 170A, and/or pathways 182A-N to the node, e.g., 170A, is ranked highest and then selected by the processor 110 to provide the required resources 178.

Once each path or digital tag 187 is ranked in operation 270, the processor 110 in operation 275 then selects the digital tag 187 with the highest rank and provides the required resources 178 from the nodes 170A-170N that correspond to the selected digital tag 187. The processor 110 sends a signal to a router 168 or other component of network 150, identifying which nodes 170A-170N are needed to obtain the required resources 178 from and forward them to the external devices 160. Once operation 275 is completed, method 200 of FIG. 2 ends.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system, comprising:

a memory configured to:

store metadata associated with each node of a plurality of nodes, wherein each of the plurality of nodes hosts at least one resource needed for performing one or more actions and the metadata indicates the at least one resource associated with a corresponding one of the plurality of nodes;

store device information associated with a corresponding one of the plurality of nodes, wherein the device information includes at least one performance parameter related to a physical configuration of one or more devices associated with a corresponding one of the plurality of nodes; and a processor operably coupled to the memory and configured to:

receive a request from an external device to perform an action;

determine which resources are needed to perform the action, wherein the action requires two or more resources;

identify, using the stored metadata, which nodes of the plurality of nodes host at least one of the two or more resources;

retrieve device information for the identified nodes and hash the device information to produce a hash value for each of the identified nodes;

combine the hash value with the metadata for each of the identified nodes to produce a token;

determine using the metadata included in each token a plurality of combinations of nodes that provide the two or more resources;

concatenate the hash values from the tokens associated with each combination to produce a digital tag for each combination;

rank the digital tags for each combination using a path optimizer algorithm based on predetermined criteria, wherein the path optimizer algorithm utilizes a weighted graph of at least the concatenated hash values in the digital tags;

select the digital tag with a highest rank; and perform the action using one or more of the nodes associated with the selected digital tag.

2. The system of claim 1, wherein the path optimizer algorithm is a swarm intelligence optimization algorithm that determines the rank of the digital tags by simulating each combination in the weight graphs, ranking each combination based on the predetermined criteria, and performing multiple iterations to determine the combination with the highest rank.

3. The system of claim 1, wherein the processor is further configured to:

periodically receive updated metadata from each of the plurality of nodes;

determine if the updated metadata indicates a change in the resources associated with a node; and update the stored metadata for the node when a change is indicated.

4. The system of claim 1, wherein the processor is further configured to:

periodically receive updated device information from each of the plurality of nodes;

determine if the updated device information indicates a change in the physical configuration of the devices associated with a node; and update the device information for the node when a change is indicated.

5. The system of claim 1, wherein the predetermined criteria comprises at least one of time taken, quality, proximity, or data readiness.

6. The system of claim 1, wherein the device information includes performance information for network connections of each of the plurality of nodes.

7. The system of claim 6, wherein the performance information comprises network latency.

8. The system of claim 1, wherein the device information comprises a current usage level of each of the plurality of nodes.

9. A method, comprising:

receiving a request from an external device to perform an action;

determining which resources are needed to perform the action, wherein the action requires two or more resources;

identifying, using stored metadata, which nodes of a plurality of nodes host at least one of the two or more resources, wherein the stored metadata includes metadata for each node and indicates which resources are hosted by each of the plurality of nodes;

retrieving device information for the identified nodes and hashing the device information to produce a hash value for each of the identified nodes;

combining the hash value with the metadata for each of the identified nodes to produce a token;

determining using the metadata included in each token a plurality of combinations of nodes that provide the two or more resources;

concatenating the hash values from the tokens associated with each combination to produce a digital tag for each combination;

ranking the digital tags for each combination using a path optimizer algorithm based on predetermined criteria, wherein the path optimizer algorithm utilizes a weighted graph of at least the concatenated hash values in the digital tags;

selecting the digital tag with a highest rank; and performing the action using one or more of the nodes associated with the selected digital tag.

10. The method of claim 9, wherein the path optimizer algorithm is a swarm intelligence optimization algorithm that determines the rank of the digital tags by simulating each combination in the weight graphs, ranking each combination based on the predetermined criteria, and performing multiple iterations to determine the combination with the highest rank.

11. The method of claim 9, further comprising:

periodically receiving updated metadata from each of the plurality of nodes;

determining if the updated metadata indicates a change in the resources associated with a node; and updating the stored metadata for the node when a change is indicated.

12. The method of claim 9, further comprising:

periodically receiving updated device information from each of the plurality of nodes;

determining if the updated device information indicates a change in a physical configuration of the devices associated with a node; and updating the device information for the node when a change is indicated.

13. The method of claim 9, wherein the device information includes performance information for network connections of each of the plurality of nodes.

14. The method of claim 13, wherein the performance information includes network latency.

15. The method of claim 9, wherein the device information comprises a current usage level of each of the plurality of nodes.

16. A non-transitory computer-readable medium storing instructions that, when executed by a processor, cause the processor to:

receive a request from an external device to perform an action;

determine which resources are needed to perform the action, wherein the action requires two or more resources;

identify, using stored metadata, which nodes of a plurality of nodes host at least one of the two or more resources, wherein the stored metadata includes metadata for each node and indicates which resources are hosted by each of the plurality of nodes;

retrieve device information for the identified nodes and hash the device information to produce a hash value for each of the identified nodes;

combine the hash value with the metadata for each of the identified nodes to produce a token;

determine using the metadata included in each token a plurality of combinations of nodes that provide the two or more resources;

concatenate the hash values from the tokens associated with each combination to produce a digital tag for each combination;

rank the digital tags for each combination using a path optimizer algorithm based on predetermined criteria, wherein the path optimizer algorithm utilizes a weighted graph of at least the concatenated hash values in the digital tags;

select the digital tag with a highest rank; and perform the action using one or more of the nodes associated with the selected digital tag.

17. The non-transitory computer-readable medium of claim 16, wherein the instructions further cause the processor to:

periodically receive updated metadata from each of the plurality of nodes;

determine if the updated metadata indicates a change in the resources associated with a node; and update the stored metadata for the node when a change is indicated.

18. The non-transitory computer-readable medium of claim 16, wherein the instructions further cause the processor to:

periodically receive updated device information from each of the plurality of nodes;

determine if the updated device information indicates a change in a physical configuration of the devices associated with a node; and update the device information for the node when a change is indicated.

19. The non-transitory computer-readable medium of claim 16, wherein the device information includes performance information for network connections of each of the plurality of nodes.

20. The non-transitory computer-readable medium of claim 16, wherein the device information comprises a current usage level of each of the plurality of nodes.

* * * * *